3,225,173
ANTI-FROST APPARATUS FOR
OPTICAL ELEMENT
Richard T. Cook, Berlin, N.J., and Warren D. Hallermeier, Philadelphia, Pa., assignors to the United States of America as represented by the Secretary of the Army
Filed July 12, 1963, Ser. No. 294,770
3 Claims. (Cl. 219—202)
(Granted under Title 35, U.S. Code (1952), sec. 266)

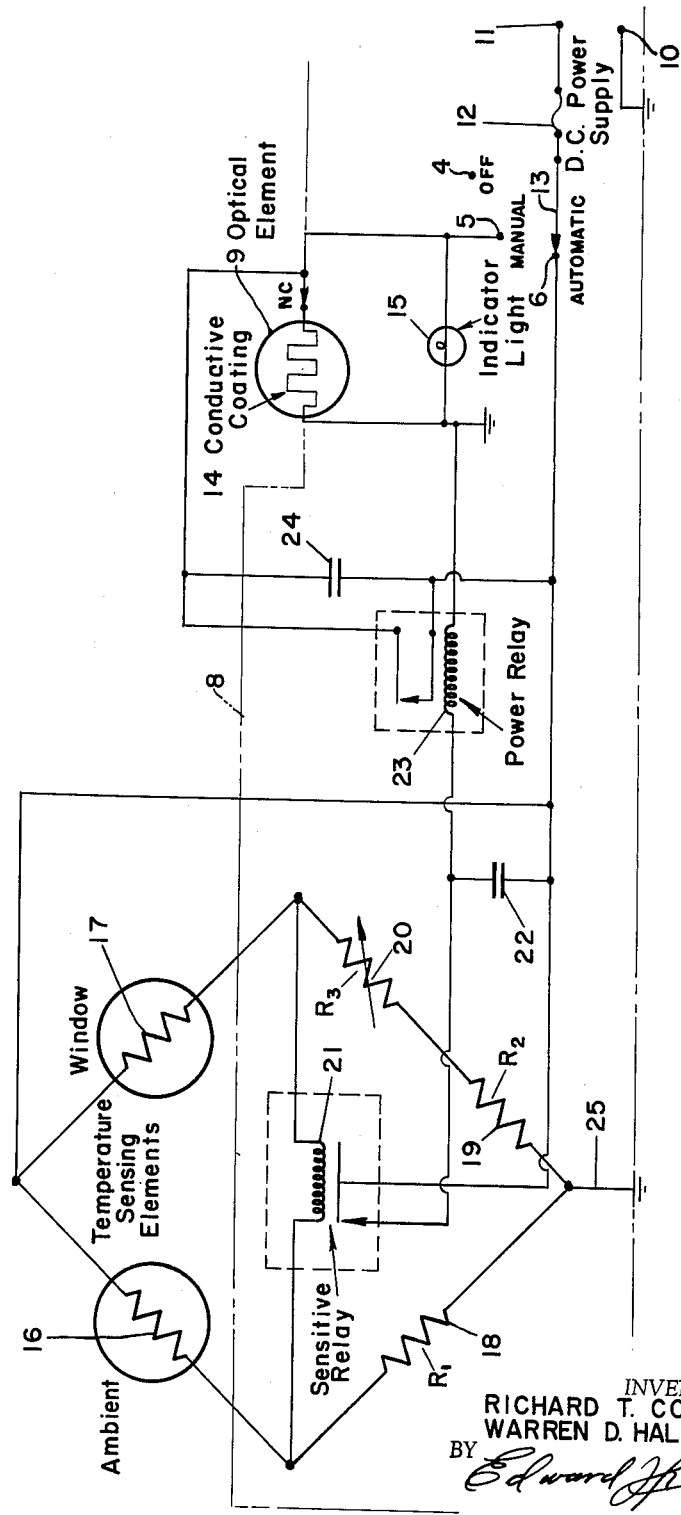

The invention described herein may be manufactured and used by or for the Government for governmental purposes without the payment to us of any royalty thereon.

This invention relates to means for maintaining an exposed outer surface of an optical element, such as a viewing window as lens in an enclosed optical instrument automatically free of moisture deposited thereon as frost or fog. An object is to maintain the surface of said element at substantially the temperature of the atmosphere or just above atmospheric temperature sufficiently to prevent frosting or fogging. Another object is to maintain such an optical surface free of frost or fog at all times with an expenditure of a minimum amount of electrical energy.

Since World War I when enclosed and amored vehicles became widely used there has been a need to maintain the exposed surfaces of viewing windows telescope and range finder outer lenses and similar exposed outer optical elements of other apparatus carried by such vehicles free of deposited moisture which might cloud the vision of an operator of such apparatus. At first when such a vehicle had been standing in cold weather, it had to suffice merely to wipe lens and window surfaces with a suitable cloth as many times as necessary to maintain clear vision. For several decades there has been a need to insure clear optical surfaces at all times in such equipment without recourse to wiping. Possibilities of arctic maneuvers and the necessity for promptness in firing have made such need acute and unfilled in combat vehicles.

According to this invention, a viewing lens or window surface may be maintained free of frost or fog at all times from the usual low voltage vehicle or like battery without danger of weakening the battery or impairing its power for starter operation and like heavy duty in the coldest weather. Specifically this has been accomplished by maintaining the exposed optical surface at substantially the temperature of the atmosphere or only slightly above it, thereby draining the battery very little. More specifically a temperature sensing element is exposed at the surface of the optical element and another temperature sensing element is located a short distance away but exposed to the ambient air. These two spaced sensing elements are substantially balanced in the arms of a Wheatstone bridge. In addition, the optical element may have its surface temperature temporarily raised for clearing it of a moisture film that may have deposited on it.

Referring to the drawings the single figure is a schematic circuit diagram of an anti-frost electrical control system for optical apparatus representing a present preferred embodiment of this invention that has been tried and proved satisfactory.

In this system terminals 10 and 11 are adapted to be connected with a 24 volt battery or other suitable low-voltage power source carried by a closed vehicle or other enclosure 8 indicated in outline and having an outer optical lens or window 9 for viewing purposes. One terminal, such as 10, is grounded to the vehicle frame. A fuse 12 of about 5 ampere size is connected between the ungrounded terminal 11 and a 3 position switch 13 where the rightmost contact 4 is at an open circuit position. The center contact 5 is used for non-automatic supply of current to a conductive substantially transparent coating 14 for initially heating, after a period of rest, the outer or exposed surface of an optical element 9, such as a viewing lens, prism, window or the like on which this coating is placed. Then the element may be heated more than it is heated automatically to hasten evaporation and removal of any moisture deposit that may accumulate during such periods. The lower left contact 6 is the one on which the switch is usually left for both night and day protection during inactivity or service.

A distinguishing characteristic of the present invention is the small amount of current required for automatically heating the optical or viewing element to be protected. Where ordinary windows and the like may be heated substantially to prevent moisture deposition, this invention provides for heating such element only very little, yet enough to prevent moisture deposition. Enough current to raise the temperature of the optical element only a degree or two is all that is required. This is because temperature sensing elements 16 and 17, of the same type, are located not far apart, but one of them 16 is exposed to the ambient atmosphere while the other 17 is to sense the temperature of the optical element to be heated, which in this case may be the viewing window of a vehicle or other enclosure or the lens of a viewing telescope or other optical instrument. That designated 17 is on the element to be slightly heated while the other 16 is located at a suitable distance which may be as much as a few feet ahead of that numbered 17 where it may be better exposed to the ambient atmosphere than is the element 17. With this invention, when the temperature drops, only a small current is needed at night or in the daytime to heat the optical element only a few degrees to the ambient air temperature. Thus this invention is adapted to prevent frost deposition when an armored tank is left out all night in the artic regions without undue drain on the battery, solely because this invention does not strive to maintain the optical element at any predetermined or definite temperature.

The optical element, to be protected from frost, is coated with a substantially transparent electrically conductive coating. That used is a Libbey-Owens-Ford coating known as 81E but other suitable transparent and electrically conductive coatings are known and represented by numeral 14. This may be considered to have a resistance of about 30 ohms per square area in the present example. No additional circuit through the coating is necessary and that illustrated is shown to depict an electric circuit, one side of which is grounded. The bridge shown is but one way of obtaining satisfactory results. A thermistor 16 responsive to temperature of the ambient atmosphere, and as used, is of about 5000 ohms such as Gulton Industries Model 35TF2. A similar thermistor 17 is of the same type and resistance value. Any temperature sensing resistors or elements such as thermocouples, having a rapid response to temperature changes are suitable. The arm 18 contains a resistance of 5000 ohms, while the remaining arm of the bridge contains a resistance R2 of 3900 ohms in series with a potentiometer or variable resistance R3 of 2500 ohms. A sensitive relay 21 is across the bridge as illustrated, which actuates a power relay 23 capable of standing a heavier current, which controls the current supplied to the coating 14 for heating the optical element 9 on which coating 14 is placed. The capacitors 22 and 24 of about 0.25 microfarad are for the purpose of suppressing arcing across the contacts of relays 21 and 23. Instead of a galvanometer, an incandescent lamp 15 was found satisfactory for showing when power was applied for heating the optical element on which the coating is placed.

The system of the present invention is of particular value for tanks and the like the mission of which involves instant readiness for action without loss of valuable seconds of time in wiping optical elements in sights and viewing windows or delay in starting an engine by a weakened battery. A low value of current flow is provided for slight heating of the optical element on which coating 14 is placed is in response to the exposed thermistor 16 being more than the desired degree above a similar thermistor 17 responsive to the temperature of the coating 14.

We claim:

1. The combination with an optical instrument having enclosure means and an outer optical element providing a light-transmitting and viewing window in said enclosure means, of electrical control apparatus for keeping an exposed outer surface of said optical element free from deposition of moisture from the surrounding atmosphere under varying ambient temperature conditions, said apparatus comprising first temperature-sensing electrical resistance means contiguous to the exposed outer surface of said optical element, second temperature-sensing electrical resistance means in the outer ambient atmosphere surrounding said surface in spaced relation to said first resistance means, a source of electrical operating current, electrically-conductive translucent heating means for the outer surface of said optical element, an electrical bridge circuit having said first and second temperature-sensing means in separate arms thereof, means for balancing said bridge circuit at a predetermined temperature of said exposed outer surface above the ambient temperature, electrical relay means connected with said bridge circuit to operate in response to an unbalance therein corresponding to a rise in the ambient temperature and a reversal of said temperature relation, and means connected with said relay means and responsive to its operation for applying heating current from said source to said heating means thereby to effect a temperature increase on said first temperature-sensing means to restore said predetermined temperature relation and the bridge balance.

2. The combination as defined in claim 1, wherein a manually-controlled switch is provided in connection with the current source and the conductive-heating means for the optical element to apply heating current directly thereto to the exclusion of the relay means for initial heating above the ambient temperature.

3. The combination as defined in claim 1, wherein the heating means for the outer surface of the optical element is an electrically-conductive coating thereon, and wherein selective switching means is provided for applying heating current directly to said conductive coating and cutting off said relay responsive means for applying heating current thereto.

References Cited by the Examiner
UNITED STATES PATENTS

| | | | |
|---|---|---|---|
| 2,462,207 | 2/1949 | Mershon | 219—203 X |
| 2,600,313 | 6/1952 | Mershon | 219—203 X |
| 2,810,055 | 10/1957 | Parkard | 219—202 X |
| 2,865,202 | 12/1958 | Bennett | 73—355 |
| 3,111,570 | 11/1963 | Strang et al. | 219—213 X |

RICHARD M. WOOD, *Primary Examiner.*

C. L. ALBRITTON, *Assistant Examiner.*